United States Patent
Goldman (10) Patent No.: US 7,880,369 B2
(45) Date of Patent: Feb. 1, 2011

(54) MOLD INCLUDING A PIEZOELECTRIC POWER GENERATING ARRANGEMENT

(76) Inventor: James A. Goldman, 43 Crosby Ave., Paterson, NJ (US) 07502

( * ) Notice: Subject to any disclaimer, the term of this patent is extended or adjusted under 35 U.S.C. 154(b) by 775 days.

(21) Appl. No.: 11/561,970

(22) Filed: Nov. 21, 2006

(65) Prior Publication Data
US 2008/0116763 A1 May 22, 2008

(51) Int. Cl.
  *H01L 41/107* (2006.01)
  *H02N 2/18* (2006.01)
(52) U.S. Cl. ..................... 310/339
(58) Field of Classification Search ......... 310/339
  See application file for complete search history.

(56) References Cited

U.S. PATENT DOCUMENTS

| | | | | |
|---|---|---|---|---|
| 3,500,451 | A * | 3/1970 | Yando | 310/330 |
| 3,970,877 | A * | 7/1976 | Russell et al. | 310/339 |
| 4,387,318 | A * | 6/1983 | Kolm et al. | 310/330 |
| 4,633,720 | A | 1/1987 | Dybel et al. | |
| 4,868,566 | A * | 9/1989 | Strobel et al. | 340/870.3 |
| 5,188,447 | A * | 2/1993 | Chiang et al. | 362/103 |
| 5,918,502 | A * | 7/1999 | Bishop | 73/172 |
| 6,345,974 | B1 | 2/2002 | Kawasaki et al. | |
| 6,402,499 | B1 | 6/2002 | Braungardt et al. | |
| 6,707,236 | B2 | 3/2004 | Pelrine et al. | |
| 7,057,330 | B2 * | 6/2006 | Buhler et al. | 310/339 |
| 7,112,049 | B2 * | 9/2006 | Fueller et al. | 425/149 |
| 7,157,835 | B2 * | 1/2007 | Sakai | 310/339 |
| 7,291,004 | B2 * | 11/2007 | Kang | 425/547 |
| 2004/0041498 | A1 * | 3/2004 | Sakai | 310/339 |
| 2004/0247724 | A1 | 12/2004 | Manner | |
| 2005/0236740 | A1 | 10/2005 | Niewels | |
| 2006/0226739 | A1 * | 10/2006 | Sakai | 310/339 |
| 2007/0188053 | A1 * | 8/2007 | Stark | 310/339 |

* cited by examiner

*Primary Examiner*—J. SanMartin
(74) *Attorney, Agent, or Firm*—Richard M. Goldberg (57) ABSTRACT

A mold having a piezoelectric power generating arrangement, includes first and second die halves having a molding cavity therein for forming a molded product when a molding material is poured therein, piezoelectric elements positioned beneath at least one die half for generating electrical power when a load is applied on the piezoelectric elements from the molding material poured into the molding cavity and in response to removal of a load of the molded product from the molding cavity, and a first arrangement for retrieving the generated electrical power and for supplying the retrieved electrical power output to an electrical storage device and/or using the retrieved electrical power output to power an external powered device.

7 Claims, 7 Drawing Sheets

MOLD INCLUDING A PIEZOELECTRIC POWER GENERATING ARRANGEMENT

BACKGROUND OF THE INVENTION

The present invention relates generally to energy generating devices, and more particularly, is directed to a mold including a piezoelectric power generating arrangement for generating electrical power in response to pouring of molding material into the mold and removal of the molded product from the mold.

Numerous industrial processes have in common the pouring of a molding material into a mold, and which include, without limitation, fluids, grains, powders, slurries and resins, and from which a finished product is later ejected. These molds are used in the field of, for example, metallurgy, plastics, masonry, baking, confectionary and terra cotta, and are all intended to be covered by the present invention.

Some of these processes involve the pouring of very hot molten material into the molds. In the United States, much of the production of 80 million tons or so of steel begins as molten metal poured about twenty feet from huge ladles into the molds.

It would therefore be desirable to tap this large volume of mechanical energy, as well as the large amount of heat energy generated in these molding operations.

OBJECTS AND SUMMARY OF THE INVENTION

Accordingly, it is an object of the present invention to provide a mold including a piezoelectric power generating arrangement that takes advantage of wasted mechanical energy in molds.

It is another object of the present invention to provide a mold including a piezoelectric power generating arrangement to tap the large volume of mechanical energy from a molding operation and convert this to electrical power.

It is still another object of the present invention to provide a mold including a piezoelectric power generating arrangement to tap the large volume of heat energy from a molding operation and convert this to electrical power.

It is yet another object of the present invention to provide a mold including a piezoelectric power generating arrangement that is relatively inexpensive to manufacture and easy to use.

In accordance with an aspect of the present invention, a mold having a piezoelectric power generating arrangement, includes first and second die halves having a molding cavity therein for forming a molded product when a molding material is poured therein. A plurality of piezoelectric elements are positioned beneath at least one die half for generating electrical power when a load is applied on the piezoelectric elements from the molding material poured into the molding cavity, and there is a first arrangement for retrieving the generated electrical power and for supplying the retrieved electrical power output to an electrical storage device and/or using the retrieved electrical power output to power an external powered device.

The mold includes a base on which the piezoelectric elements are positioned such that the piezoelectric elements protrude slightly above an upper surface of the base, and a bottom wall is positioned on the base and on the piezoelectric elements. The bottom wall can be flexible and can be connected on the base for pivoting movement between a first position on the piezoelectric elements and a second position off of the piezoelectric elements.

Optionally, the base includes at least one recess therein, and the bottom wall includes at least one bracket for fitting in the at least one recess when the bottom wall is positioned on the piezoelectric elements.

The mold further includes a side wall with an opening, an L-shaped ejection gate comprised of a closing side wall and the bottom wall connected to one end of the closing side wall. A pivoting arrangement pivotally connects the L-shaped ejection gate to the base for pivoting movement between a first closed position in which the closing side wall closes the opening in the side wall and the bottom wall is positioned on the base and on the piezoelectric elements, and a second open position in which the bottom wall is pivoted to a position off of the base and the piezoelectric elements. There is further a latching arrangement connected to the side wall for securing the L-shaped ejection gate in the closed position.

There is also a top wall movable between a closed position and an open position, and wherein the first die half is mounted on the bottom wall and the second die half is mounted on the top wall.

In addition, the plurality of piezoelectric elements generate a further electrical power output in response to removal of a load of the molded product from the molding cavity. In this regard, there is a second arrangement for retrieving the further generated electrical power output and for supplying the retrieved further electrical power output to an electrical storage device and/or using the retrieved further electrical power output to power an external powered device.

To take advantage of the heat energy in a hot product, there can also be at least one bi-metallic strip secured in a cantilevered manner to a wall surface of the mold, with at least one piezoelectric element connected at a free end of the bi-metallic strip, as well as a third arrangement for retrieving still further generated electrical power output from the at least one piezoelectric element which is connected to the bi-metallic strip and for supplying the retrieved still further electrical power output to an electrical storage device and/or using the retrieved still further electrical power output to power an external powered device.

There are also electrical contact elements mounted to the base, and wires for connecting the electrical contact elements to the piezoelectric elements for retrieving the generated electrical power.

In one embodiment, there is also a conveyor on which a plurality of the molds are positioned for movement between a pouring station at which the molding material is poured into the mold to form the molded product, and a discharge station at which the molded product is removed from the mold. The wires include first probe wires at the pouring station for connection to the electrical contact elements for retrieving the generated electrical power, and second probe wires at the discharge station for connection to the electrical contact elements for retrieving the further generated electrical power.

In accordance with another aspect of the present invention, a method of generating electrical power during a molding operation, includes the steps of arranging a plurality of piezoelectric elements on a base beneath a mold such that the piezoelectric elements protrude slightly above an upper surface of the base, pouring molding material into the mold to form a molded product, generating an electrical power output from the piezoelectric elements in response to a load from the poured molding material, retrieving the generated electrical power output, and supplying the retrieved electrical power output to an electrical storage device and/or using the retrieved electrical power output to power an external powered device.

The method also includes the steps of permitting the molding material to solidify into a molded product, removing the molded product, generating a further electrical power output from the piezoelectric elements in response to removal of a load of the molded product, retrieving the further generating electrical power output, and supplying the retrieved further electrical power output to an electrical storage device and/or using the retrieved further electrical power output to power an external powered device.

The method also includes the step of moving a plurality of the molds along a conveyor between a pouring station at which the molding material is poured into the mold to form the molded product, and a discharge station at which the molded product is removed from the mold.

The first recited step of retrieving the generated electrical power output occurs at the pouring station, and the step of retrieving the further generating electrical power output occurs at the discharge station.

The method also includes the steps of securing a bi-metallic strip in a cantilevered manner to a wall surface of the mold, with at least one piezoelectric element connected at a free end of the bi-metallic strip, retrieving still further generated electrical power output from the at least one piezoelectric element which is connected to the bi-metallic strip, and supplying the retrieved still further electrical power output to an electrical storage device and/or using the retrieved still further electrical power output to power an external powered device.

The above and other objects, features and advantages of the invention will become readily apparent from the following detailed description thereof which is to be read in connection with the accompanying drawings.

DETAILED DESCRIPTION

Figure 1:
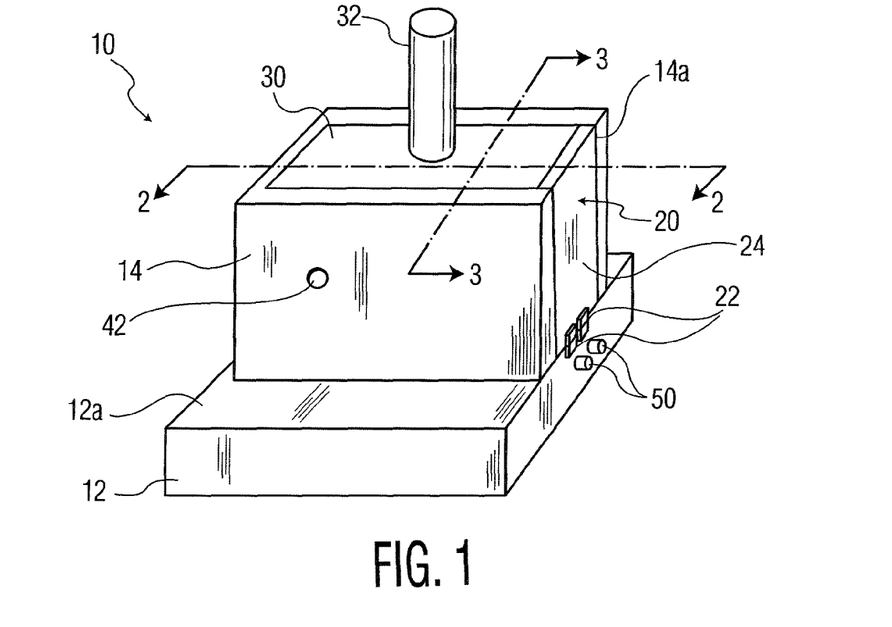
FIG. 1 is a perspective view of a mold including a piezoelectric power generating arrangement according to the present invention.

Referring to the drawings in detail, and initially to FIG. 1 thereof, a mold 10, for example, a plastic mold, a steel mold, etc. according to the present invention includes a base plate 12 having a generally square configuration, although the specific shapes and dimensions in the present application are not important. A U-shaped vertical wall 14 sits on base plate 12 and extends upwardly therefrom with one side 14a being open.

Figure 3:
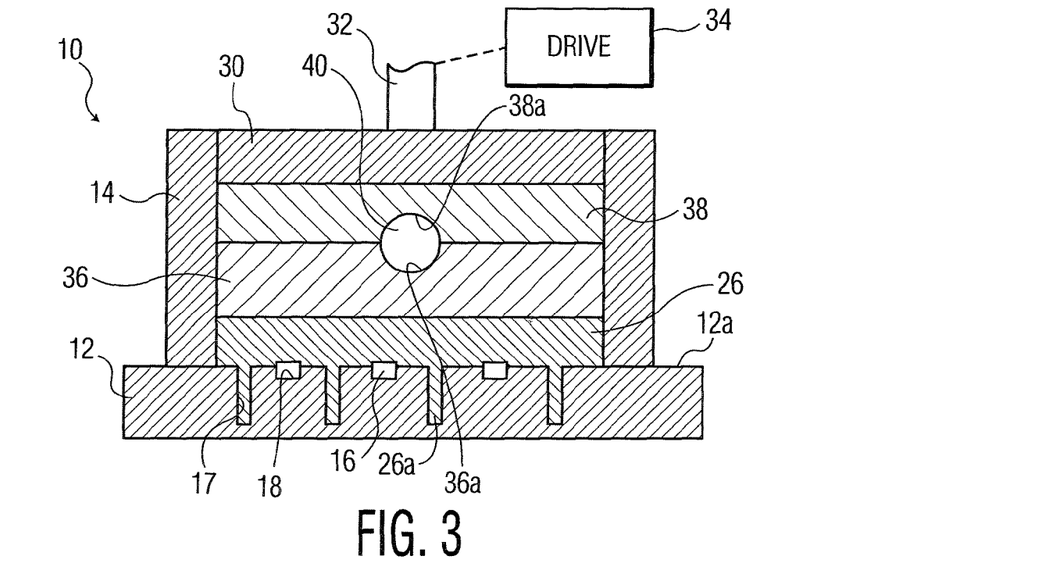
FIG. 3 is a cross-sectional view of the mold of FIG. 1, taken along line 3-3 thereof.
Figure 4:
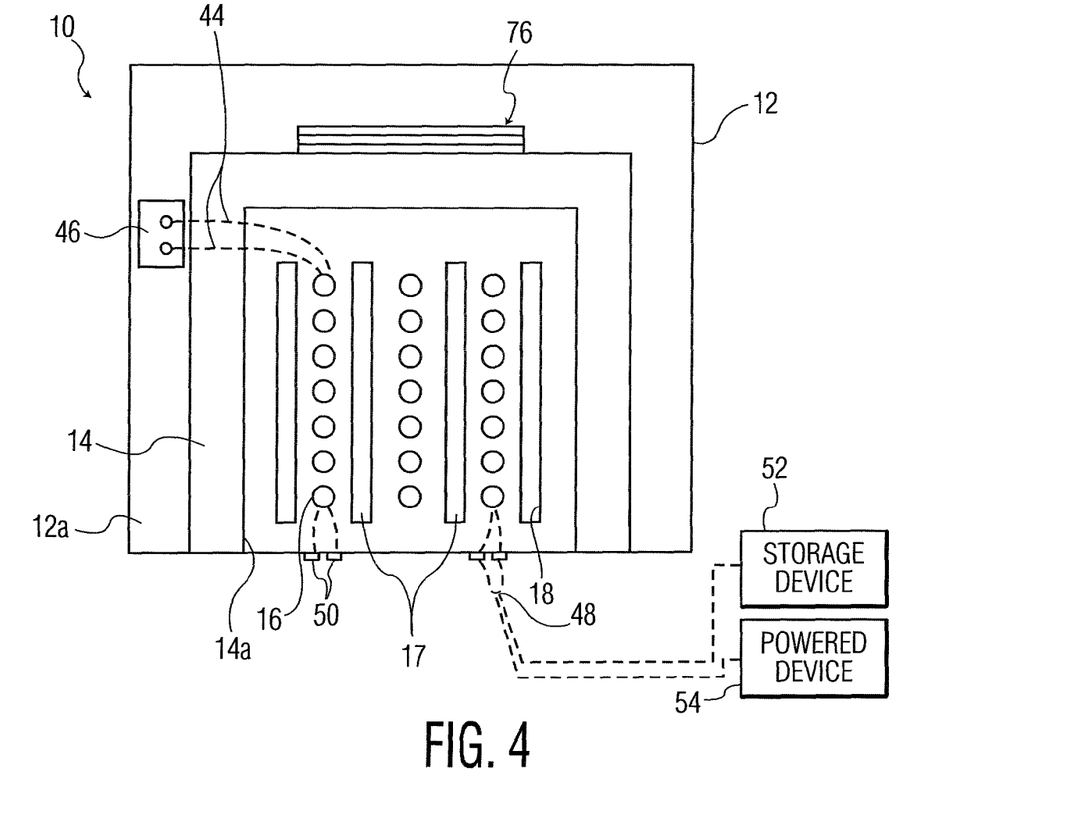
FIG. 4 is a top plan view of the mold, with the pivoting side door removed, and showing the piezoelectric elements.
Figure 5:
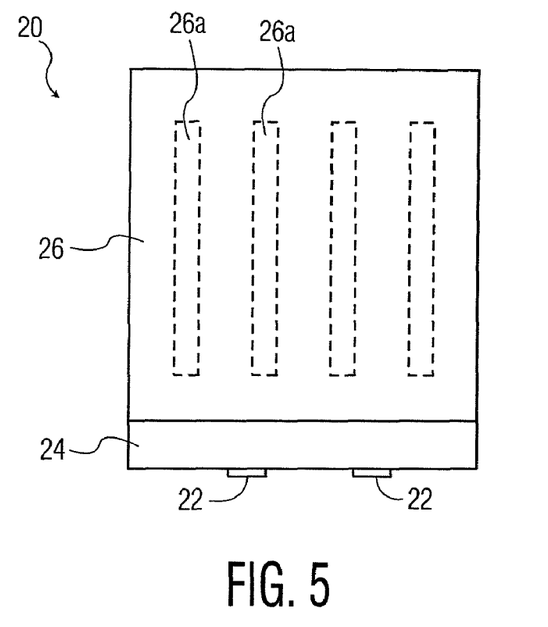
FIG. 5 is a top plan view of the pivoting door.
Figure 6:
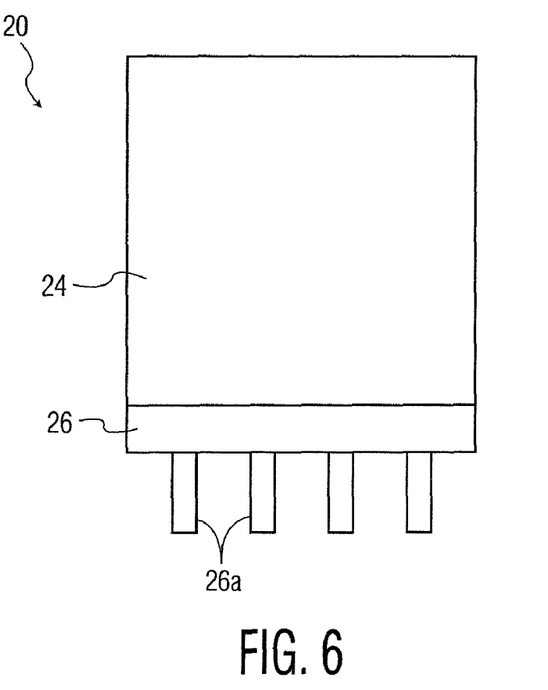
FIG. 6 is a front elevational view of the pivoting door.

As shown best in FIGS. 3 and 4, a plurality of piezoelectric elements 16 are positioned in recesses 17 at the upper surface of base plate 12 and protrude slightly above the upper surface 12a thereof. The particular spatial arrangement of piezoelectric elements 16 is not important, as long as there are a sufficient number of piezoelectric elements 16 to generate a useful electrical output. Interspersed between the rows of piezoelectric elements 16 are elongated grooves 18 in base plate 12.

To close open end 14a of U-shaped vertical wall 14, and as best shown in FIGS. 1, 2 and 5-7, there is an L-shaped ejection gate 20 that is hingedly connected by hinges 22 or any other pivoting means, such as a pivot rod, etc. to base plate 12 at open side 14a of U-shaped vertical wall 14. L-shaped ejection gate 20 includes a closing wall 24 for closing open side 14a of U-shaped vertical wall 14 and a horizontal bottom wall 26 extending transversely from the lower end of closing wall 24. When closing wall 24 closes open side 14a, bottom wall 26 sits on top of base plate 12, and in particular, on top of piezoelectric elements 16 which protrude slightly above the upper surface 12a of base plate 12. Optionally, the lower end of bottom wall 26 is preferably provided with brackets 26a which fit within grooves 18 for alignment of bottom wall 26.

In a preferred embodiment of the present invention, bottom wall 26 is a pan that has some flexibility so that it can bend or flex in a resilient manner when the molding material is added to mold 10, as will be described hereafter. However, the present invention is not limited thereto.

Figure 7:
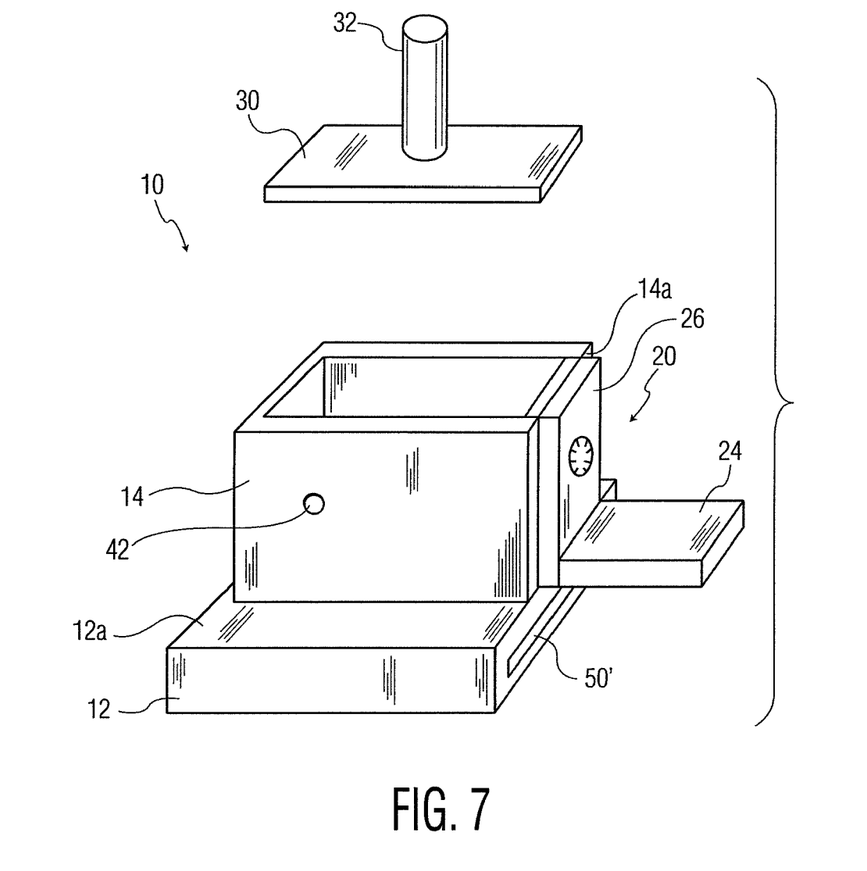
FIG. 7 is a partially exploded, perspective view of the mold in an open configuration.
Figure 9:
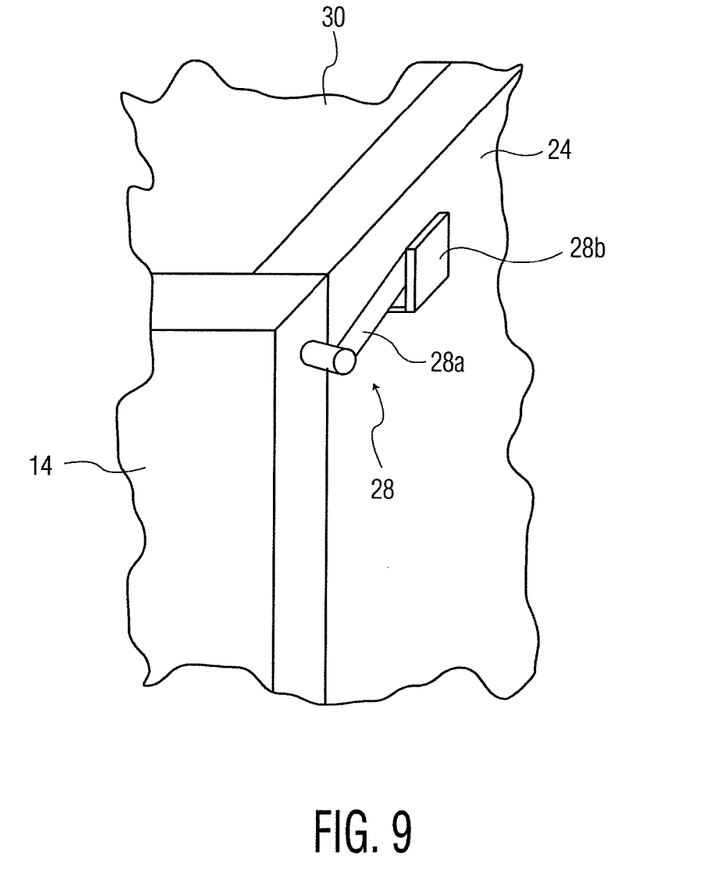
FIG. 9 is an enlarged perspective view showing the latching arrangement.

L-shaped ejection gate 20 can be tilted about hinges 22, as shown by the change from the closed position of FIG. 1 and the open position of FIG. 7. Preferably, there is some means for releasably securing L-shaped ejection gate 20 in the closed position of FIG. 1. For example, as shown in FIG. 9, the releasing means may be formed by a latching arrangement 28 provided at the upper end of U-shaped vertical wall 14 at open end 14a thereof which can include an L-shaped pivoting latch 28a on the upper end of U-shaped vertical wall 14 that can be pivoted into engagement with an L-shaped catch 28b on the upper outer surface of vertical closing wall 24 to secure L-shaped ejection gate 20 in the closed position. However, any other suitable latching arrangement can be provided, such as a solenoid actuated rod, etc., and latching arrangement 28 can be pneumatically or hydraulically driven. Latching arrangement is not shown in the other figures.

A top wall 30 is provided to close the upper open end of mold 10. In this regard, top wall 30 fits within U-shaped vertical wall 14 and closing wall 24, and can be moved reciprocally therein by a rod 32 secured thereto, which is connected to a hydraulic or pneumatic drive 34 for driving the same.

Figure 2:
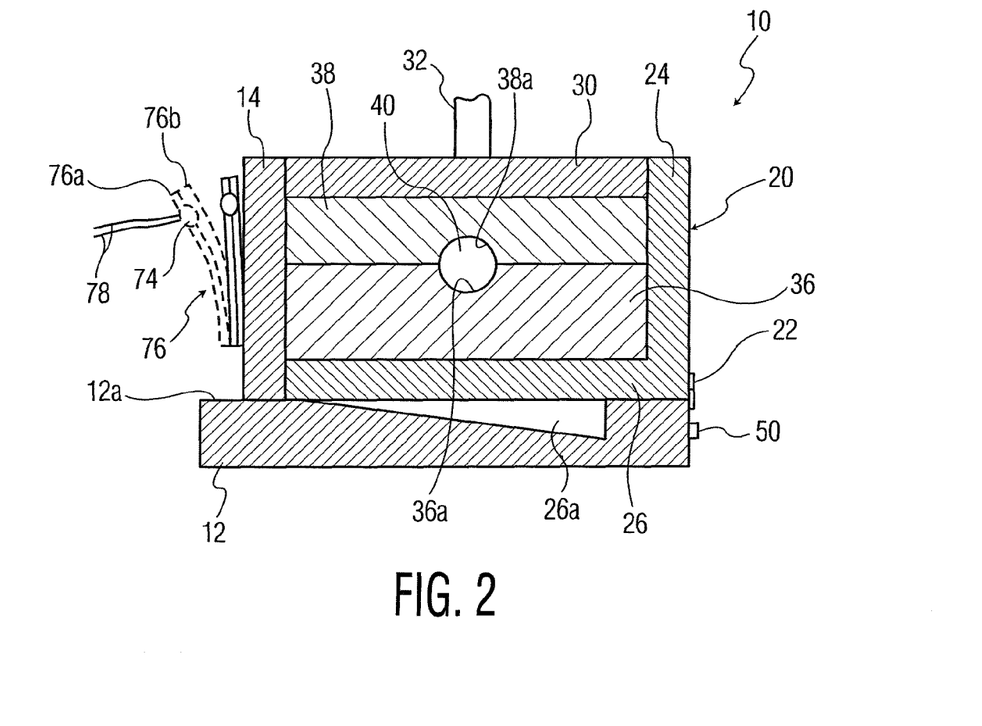
FIG. 2 is a cross-sectional view of the mold of FIG. 1, taken along line 2-2 thereof.

A lower die half 36 is fixed to the upper surface of bottom wall 26 and includes a recessed area 36a corresponding to the shape of the object to be molded. In like manner, an upper die half 38 is fixed to the underside of top wall 30 and includes a recessed area 38a corresponding to the shape of the object to be molded. When top wall 30 is moved downwardly to close the upper open end of mold 10, die halves 36 and 38 engage each other, as shown in FIGS. 2 and 3, whereby recessed areas 36a and 38a form a cavity 40 which is in the shape of the object to be molded. Cavity 40 is shown as a simple spherical shape for explanation purposes only, but the present invention is not limited thereby. A molding material is then provided into cavity 40 through, for example, a pouring opening 42 in U-shaped vertical wall 14 and through respective channels (not shown) in die halves 36 and 38. Pouring opening 42 can be formed through any other wall, including top wall 30.

It will be appreciated that the present invention is not limited to this particular arrangement of die halves 36 and 38. For example, die halves 36 and 38 can be arranged side to side.

As shown in FIG. 4, wires 44 connect piezoelectric elements 16 to an electrical storage device 46 such as a battery or the like. Alternatively, wires 48 can connect piezoelectric elements 16 to electrical contact elements 50 on base plate 12 and which can be electrically connected with an external electrical storage 52 device and/or an external mechanical or electrical powered devices 54, for example, lights, a motor, etc. that is powered for operation thereby. The electrical contact elements can alternatively be electrical contact strips 50' as shown in FIG. 7 that laterally run along base 12 so that an electrical probe can contact and slide along the contact strips 50' as the mold is moving. In such case, the electrical probe can have a roller or bearing surface at the end for rolling along the contact strips.

Figure 10:
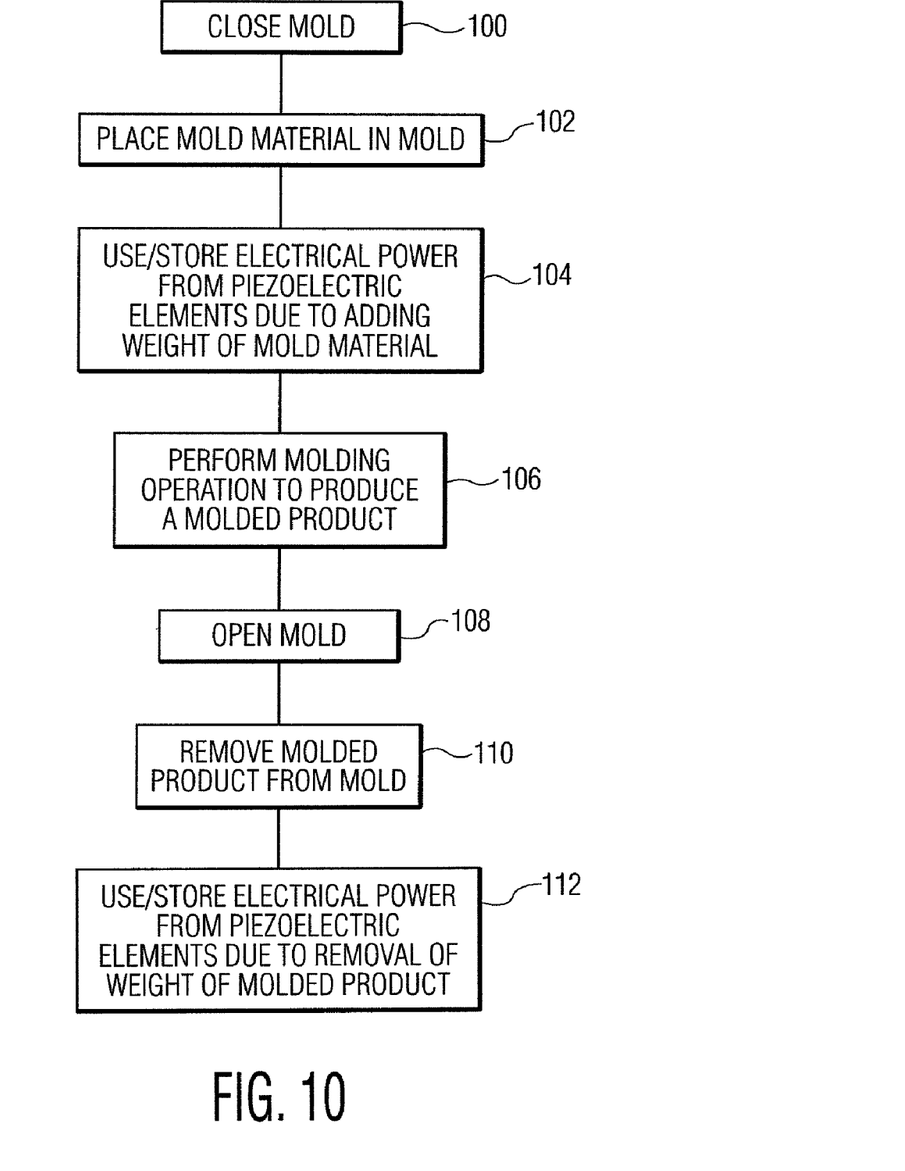
FIG. 10 is a flow chart diagram of the method of operation of the mold according to the present invention.

In operation, and referring to FIG. 10, in a first step 100, mold 10 is closed by lowering top wall 30 and pivoting L-shaped ejection gate 20 to the position shown in FIGS. 1-3 where bottom wall 26 rests on piezoelectric elements 16. Then, in step 102, molding material is poured into cavity 40 through opening 42 which is then sealed. When the molding material is added thereto, the weight thereof causes bottom wall 26 to flex a small amount as a result of the additional weight, which increases the pressure on piezoelectric elements 16. This activates piezoelectric elements 16 to cause them to output electrical power. In step 104, the electrical power from piezoelectric elements 16 is either stored in electrical storage devices 46 or 52, or used to power external mechanical or electrical powered devices 54. As a result, mechanical energy of the weight of the molding material is converted to electrical energy by the load, which electrical power can then be withdrawn and used for powering external devices. In step 106, the molding material then solidifies into the molded object. Thereafter, in step 108, the mold is opened by raising top wall 30. In step 110, the molded object is removed by pivoting L-shaped ejection gate 20 about hinges 22 to the position shown in FIG. 7. At this time, because the weight of the molded object and bottom wall 26 are removed from piezoelectric elements 16, this reduction of weight thereon again activates piezoelectric elements 16 to cause them to output electrical power. In step 112, the electrical power from piezoelectric elements 16 is again either stored in electrical storage devices 46 or 52, or used to power external mechanical or electrical powered devices 54. As a result, mechanical energy from the removal of the weight of the molding material is converted to electrical energy by the load, which electrical power can then be withdrawn and used for other purposes.

It will therefore be appreciated that, in view of the large number of molding operations throughout the world, the present invention provides a simple and inexpensive way to generate electrical power during such molding operations.

Figure 8:
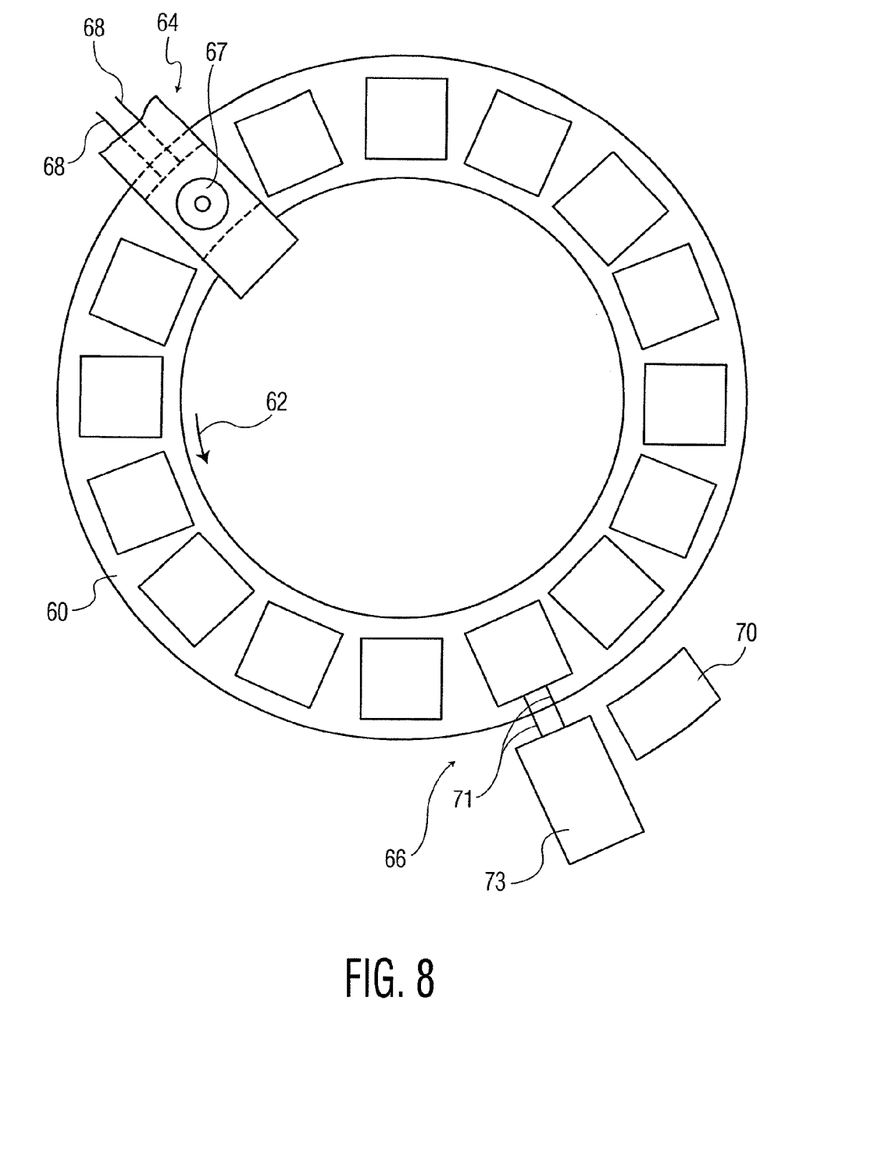
FIG. 8 is a top plan view of an automated conveyor assembly including a plurality of molds.

Further, it is possible to provide an automated molding operation with a large number of such molds 10. For example, as shown in FIG. 8, there is shown a circular conveyor 60 which is rotated in the direction of arrow 62. A plurality of molds 10 are positioned on conveyor 60 for movement between a pouring station 64 and a discharge station 66. At pouring station 64, there is a pouring spout 67 that supplies the molding material to the mold 10 at pouring station 64. In this regard, the pouring opening 42 can be provided through top wall 30 and upper die half 38. Spring loaded probe wires 68 can be in electrical contact with electrical contact elements 50 or 50' at this station such that, when the molding material is poured into mold 10 at pouring station, the additional weight actuates piezoelectric elements 16 of the mold 10 thereat to generate electrical power that is supplied through wires 48, electrical contact elements 50 and probe wires 68.

Thus, the electrical energy can either be stored in electrical storage devices 46 or 52, or used to power external mechanical or electrical powered devices 54. Thereafter, the next mold 10' is rotated by circular conveyor 60 to pouring station 64. At this time, mold 10 has the molding material therein and the mold material has begun to solidify into the molded product. Since the piezoelectric elements 16 only produce electrical energy in response to a change in the load thereon, there is no further electrical output therefrom after the molding material has been added. This operation continues until mold 10 is moved by conveyor 60 to discharge station 66. At this time, the molded product is fully formed. At discharge station 66, top wall 30 is raised up, latching arrangement is released and L-shaped ejection gate 20 is pivoted about hinges 22 to the position shown in FIG. 7, whereby the molded product can be removed from lower die half 36 and deposited on a chute 70. The pivoting of L-shaped ejection gate 20 can occur, for example, by hydraulically actuated arms 71 of a hydraulic actuator 73. However, when L-shaped ejection gate 20 is pivoted, the load on piezoelectric elements 16 is removed. The removal of this weight again actuates piezoelectric elements 16 of the mold 10 thereat to generate electrical power that is supplied through wires 48, electrical contact elements 50 and additional probe wires 72 which are in electrical contact with electrical contact elements 50 at this station. Thus, the electrical energy can either be stored in electrical storage devices 46 or 52, or used to power external mechanical or electrical powered devices 54.

In addition to piezoelectric elements 16 positioned in base plate 12, additional piezoelectric elements 74 can be provided in association with mold at other locations and which are not responsive to the pouring of molding material or removal of the molded product. For example, as shown in FIGS. 2 and 4, a bi-metallic strip 76 formed of two plates 76a and 76b or different metal with different thermal expansion coefficients and which are bonded together, is mounted to a side wall surface of mold 10 in a cantilevered manner. At least one additional piezoelectric element 74 is secured between plates 76a and 76b at the free end thereof. Thus, as mold 10 heats up, the different thermal expansion coefficients of plates 76a and 76b cause one plate to expand more than the other, which results in bending of bi-metallic strip 76, as shown by the dashed lines in FIG. 2. This, in turn, applies a load to piezoelectric elements 74 which, in response thereto, produces an electrical output that can be removed through wires 78 connected thereto. As a result, the heating of mold 10 results in the load being applied by bi-metallic strip 76 to piezoelectric elements 74. In like manner, the cooling of mold 10 results in bi-metallic strip 76 moving back to the solid line position in FIG. 2, which again applies a load to piezoelectric elements 74 which, in response thereto, produces an electrical output that can be removed through wires 78 connected thereto.

It will be appreciated that the present invention is not limited to the above embodiments, but encompasses all embodiments within the scope of the present invention. For example, vertical wall 14 can be a square four sided wall, and in such case, ejection gate 20 would not be needed. Instead, bottom wall 26 would sit on top of base plate 12, and in particular, on top of piezoelectric elements 16 which protrude slightly above the upper surface 12a of base plate 12, and would be formed by a pan that has some flexibility so that it can bend or flex in a resilient manner when the molding material is added to mold 10. In such case, the molded product can be removed by either tipping the entire mold 10 or by reaching into the mold with mechanical arms to retrieve the molded product. As a further alternative, one side wall could be hinged along a vertical axis to open and thereby remove the molded product. Alternatively, bottom wall 26 need not be flexible, but rather, the pouring of mold material would pivot ejection gate 20 to apply pressure to piezoelectric elements 16.

Further, reference to a mold in the present application and claims encompasses numerous industrial processes which have in common the pouring of a molding material into a mold, and which include, without limitation, fluids, grains, powders, slurries and resins, and from which a finished product is later ejected. These molds are used in the field of, for example, metallurgy, plastics, masonry, baking, confectionary and terra cotta, and are all intended to be covered by the present invention.

Having described specific preferred embodiments of the invention with reference to the accompanying drawings, it will be appreciated that the present invention is not limited to those precise embodiments and that various changes and modifications can be effected therein by one of ordinary skill in the art without departing from the scope or spirit of the invention defined by the appended claims.

What is claimed is:

1. A method of generating electrical power during a molding operation, comprising the steps of:
   arranging a plurality of piezoelectric elements on a base beneath a mold such that the piezoelectric elements protrude slightly above an upper surface of the base,
   pouring molding material into the mold to form a molded product such that weight of the molding material applies pressure to the piezoelectric elements,
   generating an electrical power output from said piezoelectric elements in response to said pressure from the poured molding material,
   retrieving the generated electrical power output, and
   at least one of:
      supplying the retrieved electrical power output to an electrical storage device, and
      using the retrieved electrical power output to power an external powered device.

2. A method according to claim 1, wherein the mold has a base on which the piezoelectric elements are positioned, and a flexible bottom wall positioned on the base and on the piezoelectric elements.

3. A method according to claim 1, wherein the mold has a base on which the piezoelectric elements are positioned, and a bottom wall connected on the base for pivoting movement between a first position on the piezoelectric elements and a second position off of the piezoelectric elements.

4. A method according to claim 1, further comprising the steps of:
   permitting the molding material to solidify into a molded product,
   removing the molded product,
   generating a further electrical power output from said piezoelectric elements in response to removal of a load of the molded product,
   retrieving the further generated electrical power output, and
   at least one of:
      supplying the retrieved further electrical power output to an electrical storage device, and
      using the retrieved further electrical power output to power an external powered device.

5. A method according to claim 4, further comprising the step of moving a plurality of the molds along a conveyor between a pouring station at which the molding material is poured into the mold to form the molded product, and a discharge station at which the molded product is removed from the mold.

6. A method according to claim 5, wherein the first recited step of retrieving the generated electrical power output occurs at the pouring station, and the step of retrieving the further generating electrical power output occurs at the discharge station.

7. A method according to claim 1, further comprising the steps of:
   securing a bi-metallic strip in a cantilevered manner to a wall surface of the mold, with at least one piezoelectric element connected at a free end of the bi-metallic strip,
   retrieving still further generating electrical power output from the at least one piezoelectric element which is connected to the bi-metallic strip, and
   at least one of:
      supplying the retrieved still further electrical power output to an electrical storage device, and
      using the retrieved still further electrical power output to power an external powered device.

* * * * *